(12) United States Patent
Yoshioka (10) Patent No.: US 10,525,932 B2
(45) Date of Patent: Jan. 7, 2020

(54) PRETENSIONER, RETRACTOR AND SEAT BELT DEVICE

(71) Applicant: JOYSON SAFETY SYSTEMS JAPAN K.K., Tokyo (JP)

(72) Inventor: Hirokazu Yoshioka, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 200 days.

(21) Appl. No.: 15/689,558

(22) Filed: Aug. 29, 2017

(65) Prior Publication Data
US 2018/0065595 A1    Mar. 8, 2018

(30) Foreign Application Priority Data

Sep. 7, 2016 (JP) .................................. 2016-174279

(51) Int. Cl.
*B60R 22/46* (2006.01)

(52) U.S. Cl.
CPC ...... *B60R 22/4628* (2013.01); *B60R 22/4633* (2013.01); *B60R 2022/468* (2013.01); *B60R 2022/4642* (2013.01)

(58) Field of Classification Search
CPC ............... B60R 22/46; B60R 22/4628; B60R 2022/468; B60R 2022/4633; B60R 2022/4642
See application file for complete search history.

(56) References Cited

U.S. PATENT DOCUMENTS

| 7,988,084 | B2 | 8/2011 | Lombarte et al. |
| 9,475,455 | B2 | 10/2016 | Gray et al. |
| 9,555,768 | B2 | 1/2017 | Gray et al. |
| 2007/0241550 | A1 | 10/2007 | Bieg et al. |
| 2015/0336538 | A1* | 11/2015 | Gray ................... B60R 22/4628 242/389 |
| 2015/0336539 | A1* | 11/2015 | Gray ................... B60R 22/4628 242/389 |
| 2016/0114762 | A1 | 4/2016 | Landbeck et al. |

(Continued)

FOREIGN PATENT DOCUMENTS

| DE | 20 2006 014 487 | 1/2007 |
| DE | 10 2006 015 345 | 10/2007 |
| DE | 10 2006 031 359 | 10/2007 |

(Continued)

*Primary Examiner* — Sang K Kim
(74) *Attorney, Agent, or Firm* — Foley & Lardner LLP (57) ABSTRACT

A pretensioner includes a driving wheel and a power transmission unit. A spool is rotatably disposed in the driving wheel. The spool winds a webbing. The power transmission unit transmits power to the driving wheel. The power transmission unit includes a resin-made long body and a passage of the resin-made long body. The resin-made long body rotates the driving wheel. The passage is formed in an outer circumference of the driving wheel. The passage includes a wall surface, a cover member and a stopper. The wall surface is disposed on one side surface of the driving wheel. The cover member is fixed in the wall surface from the other side surface of the driving wheel. The stopper stops a tip portion of the resin-made long body which has rotated the driving wheel. The stopper is configured by a fastening member connecting the cover member and the wall surface.

6 Claims, 4 Drawing Sheets

(56) References Cited

U.S. PATENT DOCUMENTS

2017/0225651 A1\*   8/2017   Asako .................... B60R 22/46

FOREIGN PATENT DOCUMENTS

| EP | 1 716 025 | 7/2012 |
| EP | 3 187 382 | 7/2017 |
| JP | 3617859 | 2/2005 |
| JP | 2014-201156 A | 1/2014 |
| JP | 2015-217729 | 12/2015 |
| JP | 6045425 | 12/2016 |
| JP | 6063329 | 1/2017 |
| WO | WO-2014/194993 | 12/2014 |
| WO | WO-2016/047338 | 3/2016 |
| WO | WO-2016/021422 | 11/2016 |

\* cited by examiner

PRETENSIONER, RETRACTOR AND SEAT BELT DEVICE

CROSS-REFERENCE TO RELATED APPLICATIONS

This application claims the benefit of Japanese Patent Application No. 2016-174279, filed on Sep. 7, 2016, the entire contents of which are hereby incorporated by reference, the same as if set forth at length, the entire of which are incorporated herein by reference.

TECHNICAL FIELD

The present invention relates to a pretensioner, a retractor and a seat belt device, and particularly to a pretensioner, a retractor, and a seat belt device which use a resin-made long body as a power transmission member.

BACKGROUND ART

In a vehicle such as an automobile, generally, a seat belt device which restrains an occupant is provided in a seat including a seating part on which the occupant sits and a backrest pan positioned on the back surface side of the occupant. Such a seat belt device includes a webbing which restrains the occupant, a retractor which performs winding of the webbing, a guide anchor which is provided in a vehicle body and guides the webbing, a belt anchor which fixes the webbing in the vehicle body, a buckle which is disposed on the side surface of the seat, and a tongue which is disposed in the webbing. When the tongue is fitted into the buckle, the occupant is restrained in the seat by the webbing.

In the retractor, a pretensioner which removes the looseness of the webbing during an emergency such as a collision of the vehicle is disposed in many cases. In addition, recently, it is considered that a resin column-shaped rack (resin rod) is used as a moving member (power transmission member) which rotates a spool at the time of the emergency (for example, see JP-A-2014-201156).

SUMMARY OF INVENTION

In a case where the resin-made long body (so-called resin rod) is used as a power transmission member, it is important to determine how to stop the resin-made long body discharged from a pipe. For example, in a case where the tip portion the resin-made long body collides with the wall surface of the cover member of the pretensioner to be stopped, the resin-made long body colliding with the wall surface is compressed by the inertial force or a pressure force, and a volume and a load are concentrated on the collided portion, whereby the resin-made long body is hardly confined into the cover member.

As described in JP-A-2014-201156, it is considered that the tip portion the resin-made long body which rotates the pinion is engaged with the pinion again to reduce the movement energy of the resin-made long body. However, in that case, there is a problem that a space for engaging the resin-made long body with the pinion again is necessarily secured so that the pretensioner is enlarged.

When a teeth form of the pinion remains in the resin-made long body which rotates the pinion, and the resin-made long body is engaged with the pinion again, in a case where the teeth of the teeth form and the pinion match with each other, the movement energy of the resin-made long body cannot be reduced. Therefore, in the mechanism described in JP-A-2014-201156, there is a problem that a variation is generated in the reduced amount of the movement energy.

The present invention has been made in consideration of the above-described problems, and an object thereof is to provide a pretensioner, a retractor, and a seat belt device in which a resin-made long body can be confined inside while an enlargement of the device is suppressed.

A pretensioner includes a driving wheel and a power transmission unit. A spool is disposed to be rotatable in the driving wheel. The spool winds a webbing which restrains an occupant. The power transmission unit transmits power to the driving wheel during an emergency. The power transmission unit includes a resin-made long body and a passage of the resin-made long body. The resin-made long body rotates the driving wheel. The passage of the resin-made long body is formed in an outer circumference of the driving wheel. The passage includes a wall surface, a cover member and a stopper. The wall surface is disposed on one side surface of the driving wheel. The cover member is fixed in the wall surface from the other side surface of the driving wheel. The stopper stops a tip portion of the resin-made long body which has rotated the driving wheel. The stopper is configured by a fastening member which connects the cover member and the wall surface.

A retractor includes a spool and a pretensioner. The spool winds a webbing which restrains an occupant. The pretensioner removes a looseness by winding the webbing during an emergency. The pretensioner includes a driving wheel and a power transmission unit. A spool is disposed to be rotatable in the driving wheel. The spool winds the webbing. The power transmission unit transmits power to the driving wheel during an emergency. The power transmission unit includes a resin-made long body and a passage of the resin-made long body. The resin-made long body rotates the driving wheel. The passage of the resin-made long body is formed in an outer circumference of the driving wheel. The passage includes a wall surface, a cover member and a stopper. The wall surface is disposed on one side surface of the driving wheel. The cover member is fixed in the wall surface from the other side surface of the driving wheel. The stopper stops a tip portion of the resin-made long body which has rotated the driving wheel. The stopper is configured by a fastening member which connects the cover member and the wall surface.

A seat belt device includes a webbing, a retractor, a belt anchor, a buckle and a tongue. The webbing restrains an occupant. The retractor winds the webbing. The belt anchor fixes the webbing in a vehicle body. The buckle is disposed on a side surface of the seat. The tongue is disposed in the webbing. The retractor includes a spool which winds the webbing, and a pretensioner which removes a looseness by winding the webbing during an emergency. The pretensioner includes a driving wheel and a power transmission unit. A spool is disposed to be rotatable in the driving wheel. The spool winds the webbing. The power transmission unit transmits power to the driving wheel during an emergency. The power transmission unit includes a resin-made long body and a passage of the resin-made long body. The resin-made long body rotates the driving wheel. The passage of the resin-made long body is formed in an outer circumference of the driving wheel. The passage includes a wall surface, a cover member and a stopper. The wall surface is disposed on one side surface of the driving wheel. The cover member is fixed in the wall surface from the other side surface of the driving wheel. The stopper stops a tip portion of the resin-made long body which has rotated the driving wheel. The stopper is configured by a fastening member which connects the cover member and the wall surface.

In the pretensioner, the retractor and the seat belt described above, the passage may include a guide member which is fixed in the fastening member and which guides the resin-made long body.

The cover member may include an inclined surface which restricts a movement direction of the resin-made long body immediately before colliding with the fastening member.

The cover member may include a rib which is capable of abutting on a structure forming the wall surface.

In the pretensioner, the retractor, and the seat belt device according to the above-described present invention, the stopper, which stops the movement of the resin-made long body which rotates the driving wheel of the pretensioner, is configured by the fastening member which connects the cover member and the wall surface, so that the fastening member can be disposed in a position in which a load is applied most, the separation from the wall surface of the cover member can be suppressed, and the resin-made long body can be confined in the passage. In addition, according to the present invention, it is unnecessary to actively form a detour or a containing part of the resin-made long body, and the enlargement of the device can be suppressed.

BRIEF DESCRIPTION OF DRAWINGS

FIGS. 2A and 2B are views illustrating a configuration of a pretensioner illustrated in FIG. 1; wherein

FIGS. 3A and 3B are views illustrating an operation of the pretensioner; wherein

DESCRIPTION OF EMBODIMENTS

Figure 1:
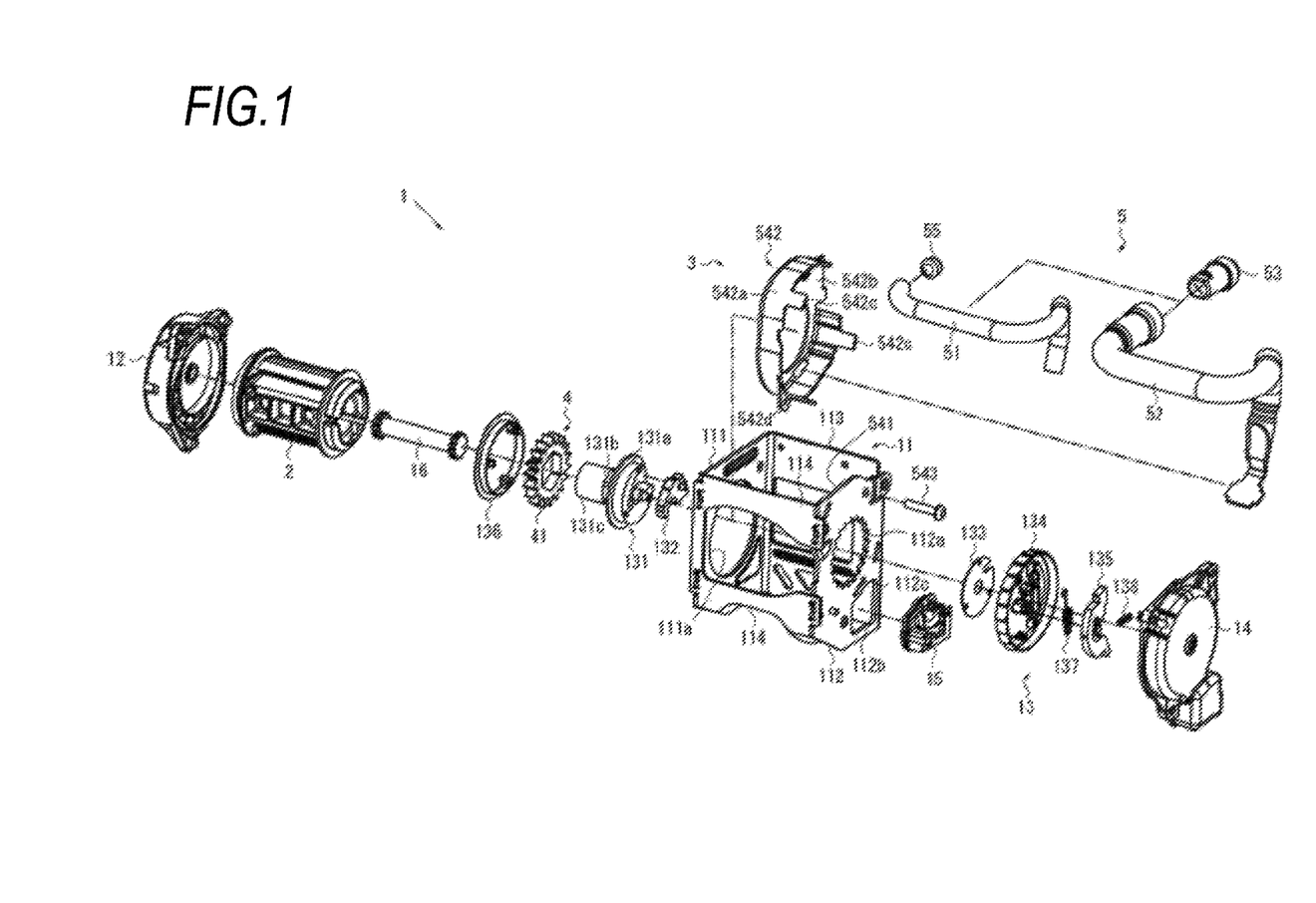
FIG. 1 is a developed view illustrating components of a retractor according to one embodiment of the present invention.
Figure 2A:
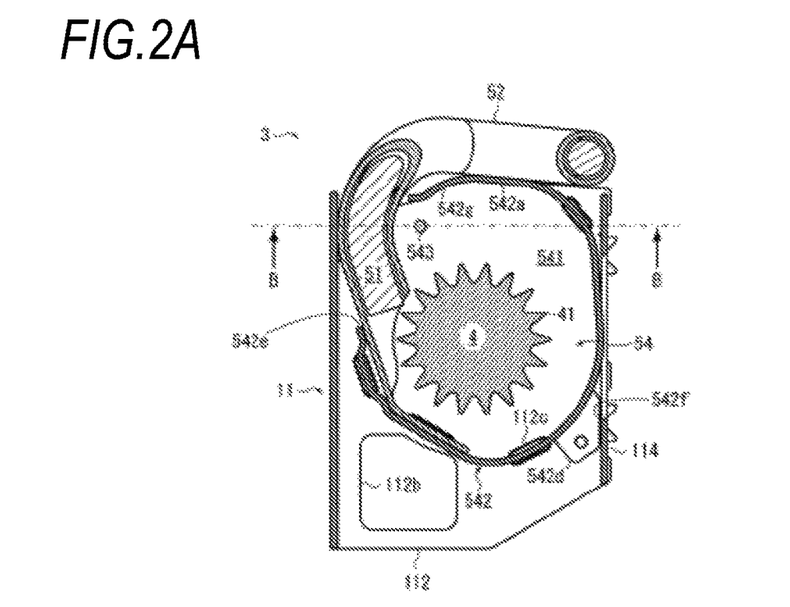
FIG. 2A is a vertical sectional view.
Figure 2B:
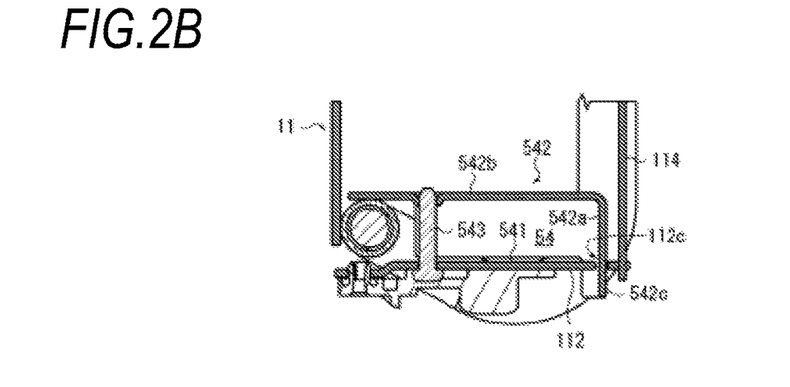
FIG. 2B is a sectional view taken along line B-B in FIG. 2A.
Figure 3A:
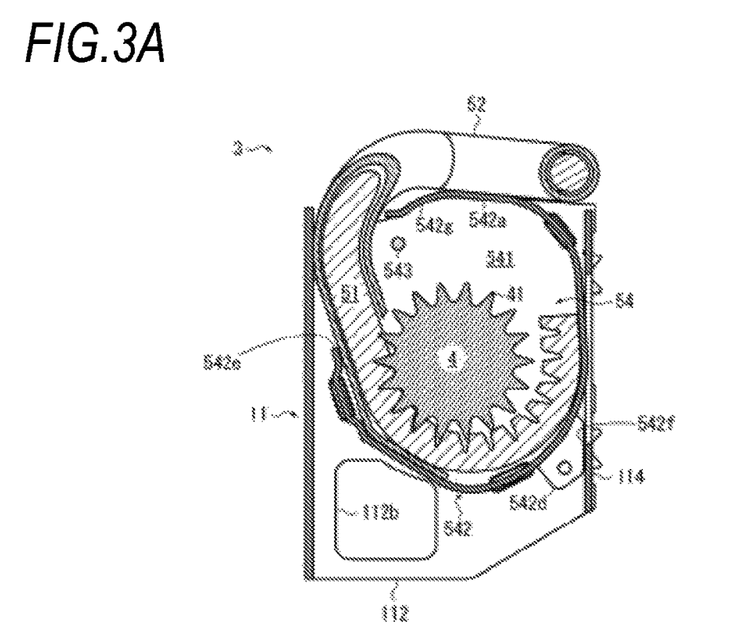
FIG. 3A illustrates a movement state of the resin-made long body.
Figure 3B:
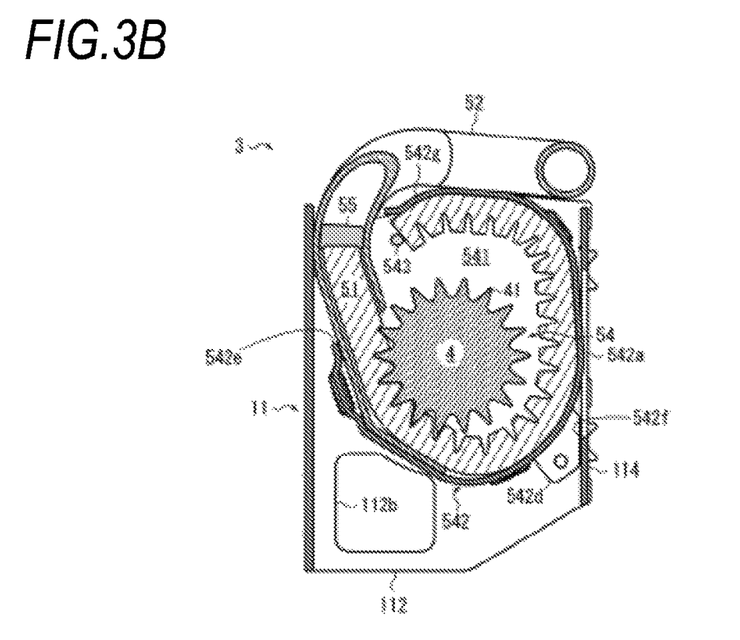
FIG. 3B illustrates a stop state of the resin-made long body.

Hereinafter, the embodiment of the present invention will be described with reference to FIGS. 1 to 5. Herein, FIG. 1 is a developed view illustrating components of a retractor according to the embodiment of the present invention. FIGS. 2A and 2B are views illustrating a configuration of a pretensioner illustrated in FIG. 1. FIG. 2A is a vertical sectional view, and FIG. 2B is a sectional view taken along line B-B in FIG. 2A. FIGS. 3A and 3B are views illustrating an operation of the pretensioner. FIG. 3A illustrates a movement state of the resin-made long body, and FIG. 3B illustrates a stop state of the resin-made long body.

For example, as illustrated in FIGS. 1 to 3B, the retractor 1 according to the embodiment of the present invention includes a spool 2 which performs winding of a webbing which restrains an occupant, and a pretensioner 3 which removes a looseness by winding the webbing during an emergency. The pretensioner 3 includes a driving wheel 4 disposed such that the spool 2 is rotatable, and a power transmission unit 5 which transmits power to the driving wheel 4 during the emergency. The power transmission unit 5 includes a resin-made long body 51 which rotates the driving wheel 4, a pipe 52 which contains the resin-made long body 51, a gas generator 53 which supplies an operation gas into the pipe 52, and a passage 54, which is formed in the outer circumference of the driving wheel 4, of the resin-made long body 51.

The passage 54 includes a wall surface 541 which is disposed on one side surface of the driving wheel 4, a cover member 542 which is fixed in the wall surface 541 from the other side surface of the driving wheel 4, and a stopper which stops the tip portion of the resin-made long body 51 which rotates the driving wheel 4. The stopper is configured by a fastening member 543 which connects the cover member 542 and the wall surface 541.

The spool 2 is a winding drum which winds the webbing, and is rotatably contained in the base frame 11 forming a frame of the retractor 1. For example, the base frame 11 has a pair of end surfaces 111 and 112 which confront each other, and a side surface 113 which connects the end surfaces. The base frame 11 may have a tie plate 114 which confronts the side surface 113 and is connected with the end surfaces 111 and 112. In addition, for example, a spring unit 12 is disposed on the end surface 111, and the pretensioner 3 and a lock mechanism 13 are disposed on the end surface 112. Incidentally, the arrangement of the spring unit 12, the pretensioner 3, the lock mechanism 13, and the like is not limited to the illustrated one.

An opening 111a through which the spool 2 is inserted is formed in the end surface 111 of the base frame 11, and an opening 112a which has internal teeth engageable with a pawl 132 of the lock mechanism 13 is formed in the end surface 112 of the base frame 11. In addition, a portion (for example, the driving wheel 4 and the cover member 542) of the pretensioner 3 is disposed on the inside of the end surface 112 of the base frame 11. That is, in this embodiment, the wall surface 514 is configured by the inner surface of the end surface 112. In addition, the lock mechanism 13 is disposed on the outside of the end surface 112 of the base frame 11, and the lock mechanism 13 is contained in the retainer cover 14.

A vehicle sensor 15 which detects the sharp deceleration of the vehicle body may be disposed in the retainer cover 14. For example, the vehicle sensor 15 has a spherical mass body, and a sensor lever which is swung by the movement of the mass body. The vehicle sensor 15 may be fitted into the opening 112b formed in the end surface 112 of the base frame 11.

The spool 2 has a hollow in the central portion, and a torsion bar 16 forming an axial center is inserted thereto. In addition, one end of the spool 2 is connected with a shaft center part of the spring unit 12. The spring unit 12 includes a flat spiral spring therein, and usually biases the spool 2 in a winding direction. Incidentally, a component which applies the winding force to the spool 2 is not limited to the flat spiral spring, and may be an electric motor and the like.

The other end of the torsion bar 16 is connected with a locking base 131 of the lock mechanism 13. As described later, the locking base 131 is configured to be engaged in the base frame 11, and can switch the torsion bar 16 between a rotating state and a non-rotating state. Therefore, in a state where the lock mechanism 13 is operated (a state where the locking base 131 is engaged with the base frame 11), even in a case where the load is applied in a direction to draw the webbing, the spool 2 can be held in the non-rotating state until a load of a threshold or more is generated in the torsion bar 16. Further, in the case where the load of the threshold or more is generated in the torsion bar 16, the spool 2 relatively generates a rotational movement when the torsion bar 16 is twisted, and the webbing is drawn.

The lock mechanism 13 includes the locking base 131 connected with the end of the torsion bar 16, the pawl 132 which is movably disposed in the locking base 131, a cover plate 133 for regulating an axial movement of the pawl 132, a lock gear 134 which is rotatably disposed on the outside of the locking base 131, and a flywheel 135 which is swingably disposed in the lock gear 134.

Incidentally, the lock mechanism 13 is not limited to the illustrated configuration, and various configurations having been known from the past may be arbitrarily selected to be used. In addition, in FIG. 1, the reference numeral 136 denotes a shaft bearing which is disposed between the cover member 542 and the spool 2. The reference numeral 137 denotes a pawl spring which applies a biasing force to the pawl 132. The reference numeral 138 denotes a hook spring which applies a biasing force to the flywheel 135.

The locking base 131 has a circular disc part 131a, a polygonal columnar driving wheel supporting part 131b which is formed on the spool 2 side of the disc part 131a and supports the driving wheel 4, and a torsion bar supporting part 131c into which the other end of the torsion bar 16 is inserted. In the illustrated embodiment, the spool 2, the torsion bar 16, the locking base 131, and the like are disposed to be coaxial with each other, so as to form a rotational axis of the spool 2.

Incidentally, herein, the description has been given about a case where the driving wheel 4 is fixed in the locking base 131, but the present invention is not limited to such a configuration. For example, the rotation of the driving wheel 4 may be transmitted to the spool 2 through a pinion gear by inserting the pinion gear connected with the spool 2 into the driving wheel 4, and engaging the internal teeth of the driving wheel 4 with the external teeth of the pinion gear as needed.

According to the lock mechanism 13 having the above-described configuration, in a case where the webbing is drawn at a rate higher than a normal drawing rate, that is, in a case where the drawing acceleration of the webbing exceeds a predetermined threshold, the flywheel 135 is swung to be engaged with the internal teeth 14a of the retainer cover 14, so as to restrict the rotation of the lock gear 134. In addition, in a case where the vehicle sensor 15 is operated, the sensor lever is engaged with the external teeth of the lock gear 134, so as to restrict the rotation of the lock gear 134.

Further, when the rotation of the lock gear 134 is restricted, a relative rotation is generated between the locking base 131 and the lock gear 134, and the pawl 132 is moved outward in the radial direction according to the relative rotation, so that the tip portion the pawl 132 is engaged in the internal teeth formed in the opening 112a of the base frame 11 (that is, the locking base 131 is engaged with the base frame 11 through the pawl 132). As a result, the rotation of the locking base 131 is restricted, and the rotation of the spool 2 also is restricted. Therefore, the drawing of the webbing is locked.

Incidentally, at a normal time (a case where the drawing acceleration of the webbing is equal to or less than a predetermined threshold), the lock mechanism 13 is not operated, and the locking base 131 and the lock gear 134 are rotated together according to the rotation of the spool 2. Therefore, at the normal time, since the locking base 131 and the lock gear 134 are not relatively rotated, the pawl 132 is configured to maintain the state where the pawl retracts to a position not to interfere with the internal teeth formed in the opening 112a of the base frame 11.

The pretensioner 3 is a component which rotates the driving wheel 4 by the power transmission unit 5 during the emergency such as the collision of the vehicle so as to remove the looseness of the webbing. Similarly to the conventional power transmission unit 5, the power transmission unit 5 has the resin-made long body 51 as a power transmission member, the pipe 52, the gas generator 53, and the cover member 542.

The resin-made long body 51 is a resin-made long member (so-called resin rod) which is plastically deformable. Herein, the "long body" means an object of which the length is sufficiently long (for example, at least several times to several ten times) with respect to a diameter. Incidentally, in the illustrated embodiment, the resin-made long body 51 is provided as a single molding body. However, the resin-made long body 51 is not necessarily one body, and may be divided to a plurality of bodies.

The pipe 52 is a pressure vessel which forms an injection cylinder of the resin-made long body 51. It is necessary that the pipe 52 has a certain length, and thus the pipe 52 is bent to be disposed along the side surface of the base frame 11. The gas generator 53 is mounted in the rear end of the pipe 52. The piston 55 receives the operation gas supplied from the gas generator 53, and is formed to be slid while sealing the inside surface of the pipe 52.

In a normal time before the operation of the pretensioner 3, as illustrated in FIG. 2A, the resin-made long body 51 is contained in the pipe 52. During the operation of the pretensioner 3, the resin-made long body 51 is discharged from the pipe 52 to the space (passage 54) formed along the outer circumference of the driving wheel 4.

The passage 54 is formed by the inside surface (wall surface 541) of the end surface 112 of the base frame 11 in which the driving wheel 4 is disposed, and the cover member 542 fixed in the end surface 112 of the base frame 11. The cover member 542 includes a side plate 542a which surrounds the outer circumference of the driving wheel 4, a top plate 542b which includes an opening in which a shaft bearing 136 is disposed, a plurality of protrusions 542c which are inserted into slits 112c formed in the end surface 112 of the base frame 11, and a rib 542d which can abut on a structure (base frame 11) configuring the wall surface 541.

As illustrated in FIG. 2A, the side plate 542a includes an opening 542e into which the tip portion the pipe 52 is inserted. In addition, the side plate 542a is disposed such that the resin-made long body 51 discharged from the pipe 52 is engaged with the teeth 41 of the driving wheel 4, and then, is formed such that a distance from the driving wheel 4 is gradually larger. The passage 54 is formed along the outer circumference of the driving wheel 4, and the resin-made long body 51 moves along the side plate 542a.

In the end point of the passage 54, that is, a position immediately before abutting the circumferential surface of the pipe 52 inserted into the cover member 542, the fastening member 543 which connects the cover member 542 in the wall surface 541 is disposed. For example, the fastening member 543 is a screw, a bolt, a nut, a rivet, and the like. Another component may be used as long as the component can fasten the cover member 542 in the wall surface 541.

The fastening member 543 is disposed in the position so that the resin-made long body 51 moved along the side plate 542a can collide with the fastening member 543, and the fastening member 543 can function as a stopper which stops the movement of the resin-made long body 51. Incidentally, in this embodiment, the description has been given about a case where one fastening member 543 is disposed. However, a plurality of fastening members 543 may be disposed in the end point of the passage 54.

In this manner, the stopper, which stops the movement of the resin-made long body 51 which rotates the driving wheel 4, is configured by the fastening member 543 which connects the cover member 542 and the wall surface 541, so that the fastening member 543 can be disposed in a position in which a load is applied most, the separation from the wall surface 541 of the cover member 542 can be suppressed, and the resin-made long body 51 can be confined in the passage 54. In addition, according to this embodiment, it is unnecessary to actively form a detour or a containing part of the resin-made long body 51, and the enlargement of the device can be suppressed.

The cover member 542 may be formed only such that the protrusions 542c are inserted into the slits 112c, or may be formed such that the protrusions 542c are inserted into the slits 112c, and then the protrusions 542c are deformed at substantially right angle. In addition, when the cover member 542 is fixed in the wall surface 541, the rib 542d has a plane disposed along the surface of the wall surface 541. Further, the rib 542d is formed such that the end 542f on the front side in the movement direction of the resin-made long body 51 abuts on the tie plate 114 fixed in the base frame 11.

Such a rib 542d is disposed in a position where a large impact is applied in the side plate 542a of the cover member 542 when the resin-made long body 51 collides with the fastening member 543, and the rib 542d and the tie plate 114 contact with each other so that the impact generated in the cover member 542 can be received, and the deformation of the cover member 542 can be suppressed. In addition, the rib 542d is disposed so that the load generated in the protrusions 542c and the fastening member 543 can be reduced.

The cover member 542 may include an inclined surface 542g which restricts the movement direction of the resin-made long body 51 immediately before colliding with the fastening member 543. Specifically, the tip portion of the resin-made long body 51 is restricted to move inward in the radial direction of the driving wheel 4, and then collides with the fastening member 543.

In this manner, when the movement direction of the resin-made long body 51 is restricted, the impact generated in the resin-made long body 51 colliding with the fastening member 543 can progress in a direction in which the resin-made long body 51 is pushed to the side plate 542a of the cover member 542. Therefore, the load generated due to the impact can be effectively received by the rib 542d formed in the cover member 542.

Herein, the description will be described about the operation of the pretensioner 3. As illustrated in FIG. 2A, in an initial state, the resin-made long body 51 is contained in the pipe 52. At that time, the tip portion the resin-made long body 51 is disposed in a position not to interfere with the driving wheel 4 in the outlet of the pipe 52.

During the emergency such as the collision of the vehicle, the operation gas of high pressure is supplied from the gas generator 53 into the pipe 52. The operation gas presses the piston 55 to be slid in the pipe 52. The piston 55 presses the resin-made long body 51 to be moved in the pipe 52. The resin-made long body 51 extruded from the pipe 52 moves toward the teeth 41 formed in the outer circumference of the driving wheel 4. As illustrated in FIG. 3A, the resin-made long body 51 colliding with the teeth 41 is engaged with the teeth 41 while being deformed plastically, and moves along the passage 54 while rotating the driving wheel 4.

As illustrated in FIG. 3A, the tip portion of the resin-made long body 51 which has rotated the driving wheel 4 is separated from the teeth 41 of the driving wheel 4, and moves along the side plate 542a of the cover member 542. The movement direction of the tip portion of the resin-made long body 51 is restricted by the inclined surface 542g of the side plate 542a of the cover member 542. Finally, as illustrated in FIG. 3B, the tip collides with the fastening member 543 to stop. At that time, the impact generated in the resin-made long body 51 progresses in a direction in which the resin-made long body 51 is pushed to the side plate 542a, and the load is absorbed by the protrusions 542c and the rib 542d of the cover member 542.

At that time, the end 542f of the rib 542d contacts with the tie plate 114 of the base frame 11, so that the deformation of the side plate 542a can be suppressed effectively. Incidentally, in this embodiment, the rib 542d contacts with the tie plate 114. However, the rib 542d may contact with another portion (for example, a convex portion and a flange portion formed in the wall surface 541) of the structure (base frame 11) forming the wall surface 541.

Figure 4:
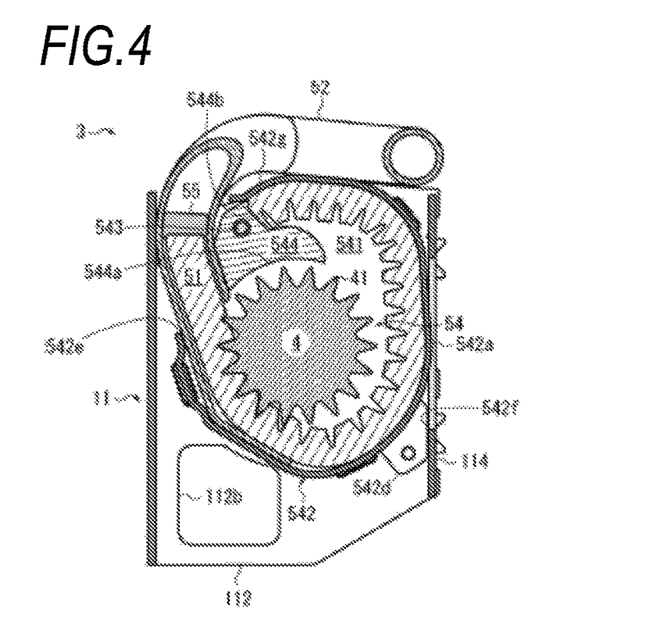
FIG. 4 is a view illustrating a modification of the pretensioner.

Herein, FIG. 4 is a view illustrating a modification of the pretensioner. In the modification illustrated in FIG. 4, a guide member 544 which is fixed in the stopper (fastening member 543) and guides the resin-made long body 51 is disposed in the passage 54. The guide member 544 includes a wall surface 544a which is disposed along the outer circumference of the driving wheel 4 and a recess portion 544b which receives the tip portion of the resin-made long body 51.

In the recess portion 544b, the tip portion of the resin-made long body 51 is fanned in a direction to collide head-on with the fastening member 543. Such a guide member 544 is disposed so that the tip portion the resin-made long body 51 can be guided in a direction to collide head-on with the fastening member 543, and the impact due to the collision of the resin-made long body 51 can be received effectively by the fastening member 543. Therefore, in the modification, the resin-made long body 51 collides indirectly with the fastening member 543 through the guide member 544. In addition, in this modification, the stopper can also be referred to be configured by the fastening member 543 and the guide member 544.

Figure 5:
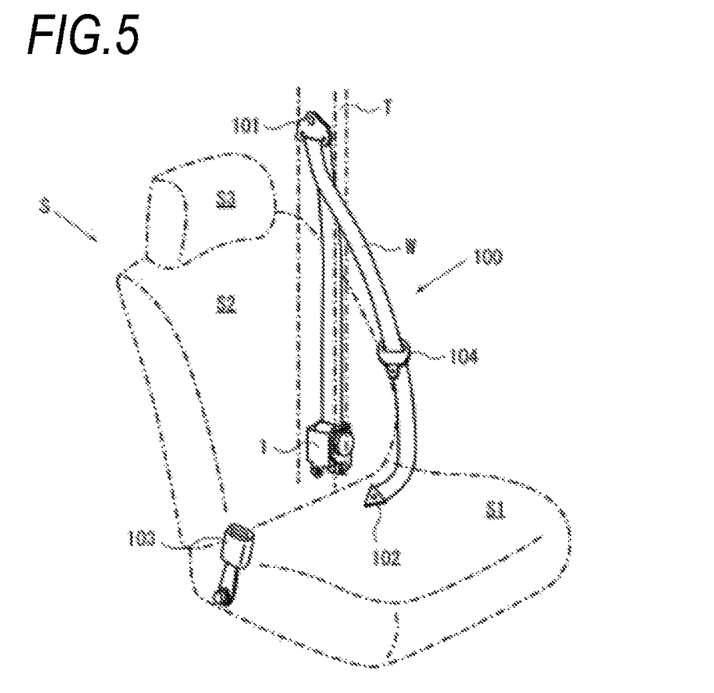
FIG. 5 is an entire configuration view illustrating a seat belt device according to the embodiment of the present invention.

Next, a seat belt device according to the embodiment of the present invention will be described with reference to FIG. 5. Herein, FIG. 5 is an entire configuration view illustrating the seat belt device according to the embodiment of the present invention. Incidentally, in FIG. 5, for the convenience of description, the components other than the seat belt device are illustrated by one-dot chain lines. In addition, a seat belt device 100 illustrated in FIG. 5 indicates a seat belt device which is disposed on a front seat (a driver seat or a passenger seat) of the vehicle.

The seat belt device 100 illustrated in FIG. 5 according to this embodiment includes a webbing W which restrains the occupant, the retractor 1 which performs winding of the webbing W, a guide anchor 101 which is provided in the vehicle body to guide the webbing W, a belt anchor 102 which fixes the webbing W in the vehicle body, a buckle 103 which is disposed on the side surface of the seat S, and a tongue 104 which is disposed in the webbing W. For example, the retractor 1 has the configuration illustrated in FIG. 1.

For example, the seat S includes a seating part S1 on which the occupant sits, a backrest portion S2 which is positioned on the back surface of the occupant, and a headrest S3 which supports the head of the occupant. For example, the retractor 1 is built in a B pillar T of the vehicle body. In addition, generally, in many cases, the buckle 103 is disposed on the side surface of the seating part S1, and the belt anchor 102 is disposed on the lower surface of the seating part S1. In addition, in many cases, the guide anchor 101 is disposed in the B pillar T. Further, in the webbing W, the one end is connected with the belt anchor 102, and the other end is connected with the retractor 1 through the guide anchor 101.

Therefore, in a case where the tongue 104 is fitted into the buckle 103, the webbing W is drawn from the retractor 1 while sliding along an insertion hole of the guide anchor 101. In addition, in a case where the occupant fastens the seat belt, or a case where the seat belt is released at the time of getting-off, the webbing W is wound by the effect of the spring unit 12 of the retractor 1 until a certain load is applied The present invention is not limited to the above-described embodiment. For example, the present invention may be applied to a seat belt device used in a rear seat of the vehicle, and to a seat belt device used in other vehicles in addition to the vehicle. The present invention may be modified variously without departing from the spirit and scope of the invention.

What is claimed is:

1. A pretensioner comprising:
   a driving wheel in which a spool is disposed to be rotatable, the spool winding a webbing which restrains an occupant; and
   a power transmission unit that transmits power to the driving wheel during an emergency, wherein
   the power transmission unit includes:
      a resin-made long body that rotates the driving wheel; and
      a passage of the resin-made long body that is formed in an outer circumference of the driving wheel,
   the passage includes:
      a wall surface that is disposed on one side surface of the driving wheel;
      a cover member that is fixed in the wall surface from the other side surface of the driving wheel; and
      a stopper that stops a tip portion of the resin-made long body which has rotated the driving wheel, and
   the stopper is configured by a fastening member which connects the cover member and the wall surface.

2. The pretensioner according to claim 1, wherein
   the passage includes a guide member that is fixed in the fastening member and that guides the resin-made long body.

3. The pretensioner according to claim 1, wherein
   the cover member includes an inclined surface that restricts a movement direction of the resin-made long body immediately before colliding with the fastening member.

4. The pretensioner according to claim 1, wherein
   the cover member includes a rib that is capable of abutting on a structure forming the wall surface.

5. A retractor comprising:
   a spool that winds a webbing which restrains an occupant; and
   a pretensioner that removes a looseness by winding the webbing during an emergency wherein
   the pretensioner is the pretensioner according to claim 1.

6. A seat belt device comprising:
   a webbing that restrains an occupant;
   a retractor that winds the webbing;
   a belt anchor that fixes the webbing in a vehicle body;
   a buckle that is disposed on a side surface of the seat; and
   a tongue that is disposed in the webbing, wherein
   the retractor includes a spool which winds the webbing, and a pretensioner which removes a looseness by winding the webbing during an emergency, and
   the pretensioner is the pretensioner according to claim 1.

* * * * *